United States Patent [19]

Roth et al.

[11] Patent Number: 4,493,405
[45] Date of Patent: Jan. 15, 1985

[54] CLUTCH AND BRAKE WITH BEARING PROTECTION

[75] Inventors: Martin Roth, Taufkirchen; Bernhard Stahn, Irschenhausen, both of Fed. Rep. of Germany

[73] Assignee: Messerschmitt-Bölkow-Blohm GmbH, Fed. Rep. of Germany

[21] Appl. No.: 353,619

[22] Filed: Mar. 1, 1982

[30] Foreign Application Priority Data

Feb. 27, 1981 [DE] Fed. Rep. of Germany ....... 3107385

[51] Int. Cl.³ .............................................. F16D 67/02
[52] U.S. Cl. ................................ 192/18 R; 192/70.15; 192/97
[58] Field of Search ................. 192/18 R, 18 A, 18 B, 192/21, 94, , 114 R, 70.15, 70.23, 66, 52, 54, 94, 97, 48.1

[56] References Cited

U.S. PATENT DOCUMENTS

| | | | |
|---|---|---|---|
| 1,323,362 | 12/1919 | Haynes | 192/70.15 |
| 1,922,350 | 8/1933 | Bolton | 192/70.15 |
| 3,194,367 | 7/1965 | Winter | 192/18 B |
| 4,194,412 | 3/1980 | Boyer | 192/114 R |

FOREIGN PATENT DOCUMENTS

| | | | |
|---|---|---|---|
| 0354741 | 6/1922 | Fed. Rep. of Germany | 192/18 R |
| 2246197 | 3/1974 | Fed. Rep. of Germany | 192/94 |

*Primary Examiner*—George H. Krizmanich
*Assistant Examiner*—M. Manley
*Attorney, Agent, or Firm*—McGlew and Tuttle

[57] ABSTRACT

A bearing unit comprises a first shaft carrying the bearing proper, a second shaft extending coaxially at least partly within the first shaft and cooperating with the load, and a shaft coupling device which engage the two shafts with each other in both the axial and the radial direction. The device can be disengaged if the second shaft is exposed to an undesirable load, such as impacts or vibrations, in order to protect the bearing proper.

11 Claims, 4 Drawing Figures

CLUTCH AND BRAKE WITH BEARING PROTECTION

FIELD AND BACKGROUND OF THE INVENTION

The present invention relates in general in bearing units and in particular to a new and useful bearing unit which includes a mechanism for protecting sensitive low friction bearings, particularly those adapted for use in space vehicles and the like.

Particularly in space vehicles, such as satellites, bearings are employed which are required to be highly sensitive, namely to have a small friction torque. This, however, makes them relatively very vulnerable to damage by oscillations and impacts such as occurring during the launch or landing phase of vehicles of this kind.

SUMMARY OF THE INVENTION

The present invention is directed to a bearing unit which is capable of protecting the sensitive bearing proper from oscillations and impacts communicated to the bearing during periods in which the bearing is not needed for operation.

Accordingly an object of the present invention is to provide a bearing unit which comprises a housing, a first shaft rotatably mounted to the housing, at least one bearing connected between the housing and the first shaft for rotatably mounting the first shaft, a second shaft coaxially mounted and at least partially extending within the first shaft adapted to drive a load with rotation of the second shaft, drive means connected to the first shaft for rotating the first shaft, and shaft coupling means connected to the first and second shafts which is movable into a first position for engaging the first and second shafts against relative axial and radial motion and into a second position for disengaging the shafts from each other.

Due to the inventive interengagement of separate shafts with a shaft coupling means therebetween, the highly sensitive precision bearing can remain uncoupled from the second or load shaft during the period in which the shaft is exposed to impacts and vibrations, for example while the vehcle is put into orbitt, as with an earth satellite.

Another object of the invention is to provide such a bearing unit wherein the coupling means or device comprises a threaded spindle which is coaxially received within the load or second shaft, at least two nuts threaded onto the threaded spindle, and coupling members which are driven by the nuts for engaging both the first and second or load shafts.

A still further object of the invention is to provide such a bearing unit wherein the coupling members comprise tapered rings which are brought simultaneously into engagement with both shafts.

A still further object of the invention is to provide such a bearing unit wherein the threaded spindle is actuated by an actuator which is mounted as an integral part of the load shaft.

One further object of the invention is to provide such a bearing unit wherein the coupling member includes at least three balls which are positioned between a friction brake shoe and an element connected to one of the nuts. This is particularly advantageous if large temperature differences, such as up to 100° K., are expected between the two shafts. That is, in such an instance the balls compensate for the temperature-dependent variations in length and prevent a drop or loss of the biasing tension which is necessary for establishing a quite satisfactory engagement.

Another object of the invention is to provide such a bearing unit which includes a stop that fixes the mutual angular position of the first and second shafts. Such an arrangement ensures that the torque produced by the drive means in the form for example of a torque motor, is transmitted through the bearing shaft to the load shaft without play, while with the shaft coupling device disengaged, impacts and oscillations taken up by the load shaft are not transmitted to the bearing proper.

A further object of the invention is to provide such a bearing unit which includes a force bridge that transmits forces on the load shaft to the housing when the coupling means or device disengages the first shaft from the second or load shaft. The force bridge is intended to transmit the impacts and oscillations communicated to the load shaft during a period of time in which the shaft coupling is disengaged, to the housing of the bearing unit which is insensitive in this regard. The force bridge is coupled to and positively controlled by the shaft coupling device. The friction bridge preferably employed for this purpose may be designed in accordance with the disclosure in the desorption of embodiments (FIGS. 3, 4).

Another object of the invention is to provide such a bearing unit which includes an elastic connecting member connected between the housing and the first shaft so that at the same time a maximum possible radial stiffness is provided while axial mobility is still permitted to compensate for temperature dependent length variations.

A further object of the invention is to provide a bearing unit with bearing protection which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
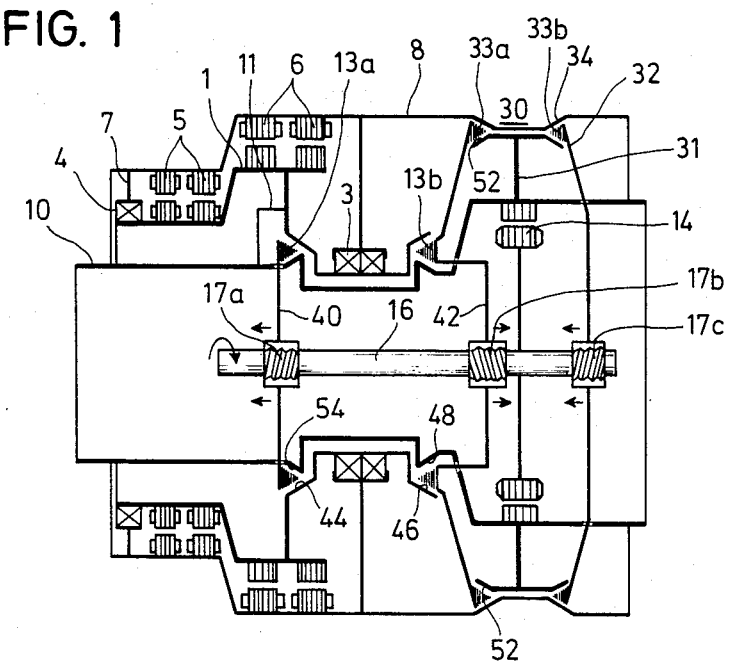
FIG. 1 is a diagrammatical sectional view of one embodiment of the inventive bearing unit.
Figure 2:
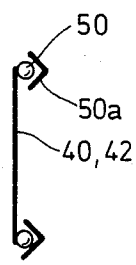
FIG. 2 shows schematically how a tapered ring according to FIG. 1 is replaced by balls, FIG. 3 an axial cross section through one half of an suitable friction brake, and FIG. 4 a cross section along line II—II of FIG. 3.

Referring to the drawings, in particular the invention embodied therein in FIG. 1 comprises a bearing unit with bearing protection which includes a first or driven shaft rotatably mounted in a housing and coaxially receiving at least partially therein a second or load shaft with a coupling device or coupling means therebetween which has a first position for coupling the first and second shaft together for fixing the axial and radial relative position between the shafts and permitting rotation of the second shaft with rotation of the first shaft, and a second position for disengaging the load shaft from the first shaft to protect the bearings of the first shaft.

The inventive bearing unit subsequently comprises a first or bearing shaft 1 carrying the bearing proper which, in the present embodiment, includes two partial bearings 3 and 4, a second or load shaft 10 cooperating with the load (not shown), for example a satellite position controller, and extending coaxially with and at least partly within bearing shaft 1, a shaft coupling device by which the two shafts 1 and 10 are engageable with and disengageable from each other in the axial and radial directions, and a housing 8. The bearing shaft may also be designed as an input shaft since it is drivable by torque motors 6, and load shaft 10 may be designated as an output shaft since it transmits the torque produced by the torque motors 6 to the operated device, such as a position controller. Resolvers 5 may operate in conjunction with shaft 1 to tell its angular position in known fashion.

More particularly, the shaft coupling device comprises a threaded spindle 16 coaxially within load shaft 10, two nuts 17a, 17b engaged on spindle 16, and tapered rings 13a, 13b which are carried by the nuts and can be brought into simultaneous engagement with both shafts 1 and 10 through an actuator 14 integrated in load shaft 10. Actuator 14 may be a torque motor.

Each nut 17a and 17b is connected through a web 40, 42 respectively to the tapered rings 13a, 13b. The tapered rings act as brake shoes against surfaces 54, 44 and 48, 46 which act as brake linings. With rotation of spindle 16 in a direction to move nuts 17a, 17b away from the arrows shown, brake shoes 13a, 13b engage the brake linings of the first and second shaft to axially and radially fix the relative position of the first and second shafts. In ths position of the coupling device the rotation of the first shaft will be transmitted to the second shaft.

In cases where there is a possible large temperature differential between the first and second shafts, the brake shoes 13a, 13b are replaced by at least three equidistant balls 50 which separate the respective plate 40 or 42 from a brake shoe member 50a. In this way the temperature variations which may cause differences in the axial length of the first and second shafts is compensated since at all times firm contact is established between the plates 40, 42 and the brake shoes 50a.

The two shafts 1 and 10 are fixable in their mutual angular positions by means of a tangentially biased and effective stop 11 which is only diagrammatically indicated in FIG. 1 and preferably designed as a lug with a tension spring.

With the shaft coupling device disengaged, an engageable and disengageable force bridge 30 transmits the force acting on load shaft 10 (impacts, oscillations) to the housing 8 of the bearing unit. Force bridge 30 includes an engageable and disengageable friction brake (see e.g. FIGS. 3 and 4) comprising a first brake member which is fixed to load shaft 10 and designed as a flange 31 secured to shaft 10 and carrying a brake ring 32, a second brake member in the form of two tapered rings or brake shoes 33a, 33b, and a third brake member in the form of a brake lining 34 provided on housing 8.

Tapered ring 33a of the friction brake is connected to tapered ring 13b of the shaft coupling, so that it is actuable by nut 17b engaged on threaded spindle 16, while tapered ring 33b is directly connected to a nut 17c engaged on threaded spindle 16.

In FIG. 1, the twist direction of the individual nuts 17a to 17c are shown, and their different directions of displacement are indicated by the arrows. This ensures in a simple way that with the shaft coupling device engaged, the force bridge is out of operation, and vice versa.

Between partial bearing 4 and housing 8, an annular diaphragm 7 is provided having the properties mentioned above of restoring rotation but permitting some axial play.

Preferably, an axial stop (not shown) is provided on load shaft 10, which is designed as a diaphragm fixing the position of housing 8 relative to load shaft 10 during the engagement of the force bridge, so that load shaft 10 becomes automatically aligned with housing 8 and tapered rings 33a and 33b are pressed into contact uniformly, to obtain a satisfactory operation of the force bridge.

While specific embodiments of the invention have been shown and described in detail to illustrate the application of the principles of the invention, it will be understood that the invention may be embodied otherwise without departing from such principles.

Figure 3:
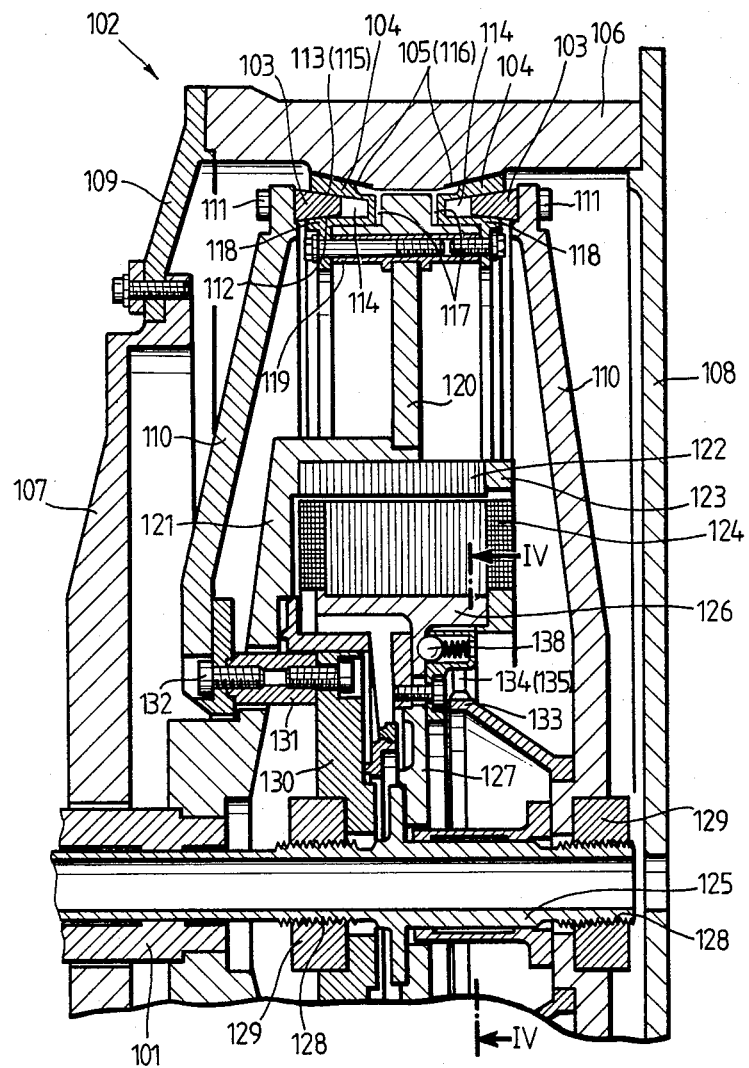
Figure 4:
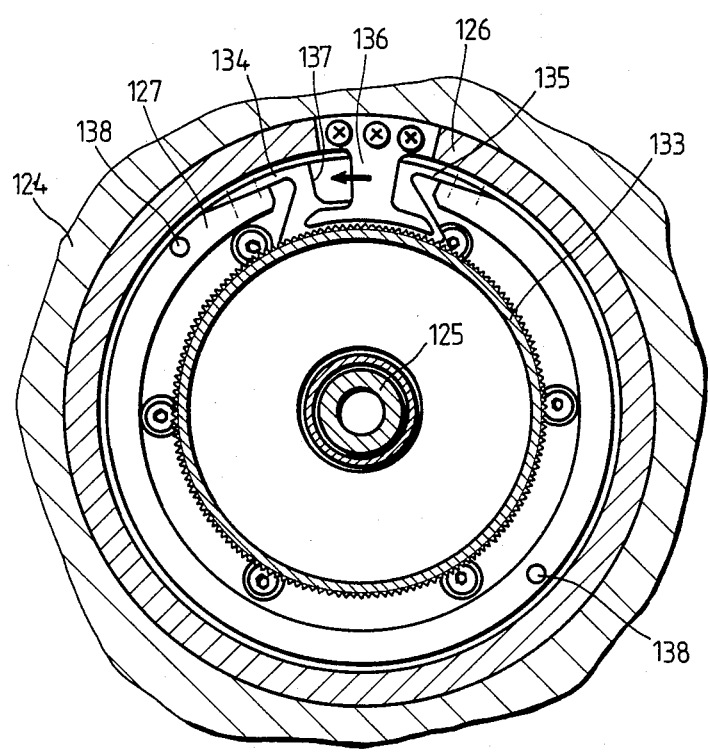

The friction brake shown in FIGS. 3 and 4 is intended for shaft 101, which rotates inside housing 102. Essentially, the friction brake comprises two axially movable annular cones 103 axially opposite to each other and arranged on both sides symmetrically with respect to a radial plane, brake rings 104 and the inside cone surfaces with brake lining 105 of brake sleeve 106.

Brake sleeve 106 represents one part of housing 102, which is further composed of flanges 107 and 108 as well as of intermediate ring 109. Brake sleeve 106, flanges 107 and 108 as well as intermediate ring 109 are firmly fixed to each other, for example bolted.

Each axially movable, annular cone 103 consists preferably of several ring segments distributed evenly over the circumference. Cones 103, or the ring segments, respectively, of which they are composed, are secured to disc washers 110 so as to be axially relocatable. For this purpose, each cone 103 or each ring segment, respectively, is held axially in the relevant disc washer 110 by bolt 111, which can be shifted in a radial slot in disc washer 110. This prevents the transmission of radial forces via cons 103 or the ring segments, respectively, to shaft 101. Changes in length occurring due to thermal influences are likewise compensated for without affecting the contact pressure between brake ring 104 and brake sleeve 106.

Each axially movable cone 103 is conical at its inside peripheral area 112 as well as at its outside peripheral area 113 and symmetrical, i.e., the inside cone area 112 and the outside cone area 113 are inclined opposite each other but at the same angle.

Each brake ring 104 is formed by the collar-shaped outer flange of ring 114 with a somewhat U-shaped cross section. The axially movable cone 103 engages in the opening of the U or the groove of ring 114, its outside cone area 113 adjoining the two inside cone areas 115 of ring 114. Slots are distributed evenly over the circumference of the outer flange or brake ring 104 in order that the latter is flexible in radial direction. The outer flange sections between the slots then form leaf springs which are pretensioned radially inwards.

It is important that brake ring 104 or these outer flange sections, respectively, of brake ring 104 are stiff enough in peripheral direction in order to ensure that the braking forces are transmitted from housing 102 to shaft 101.

The outside cone area 116 of brake ring 104 is opposite the inside cone area of brake sleeve 106 or brake lining 105, respectively, and comes to rest against it during the braking procedure. When the brake is suitable for use in a vacuum, for instance in space, the friction lining is made of a non-outgassing material with as high as possible a coefficient of friction.

The outside cone area 113 and the inside cone area 112 of each axially relocatable cone 103 are coated with a lubricant, for instance a sliding varnish, so that friction between cone 103 and the inside cone areas 115 of ring 114 is slight.

The lubricated outside and inside cone areas 112 and 113 of each axially movable cones 103 can be inclined at a relatively small angle to the axial direction. This is designed to achieve good transmission, i.e., a high contact pressure of brake ring 104 on the friction lining or brake sleeve 106, respectively, involving relatively little expenditure of force. Hence in practice a brake based on the invention achieves a braking moment of 1200 Nm at a motor torque of only 6.3 Nm with a closing time amounting to merely 1.5 sec.

On the other hand, the inclination of the outside and inside cone areas 112 and 113 of cone 103 must be large enough to permit cone 103 to move out of ring 114 when the brake is released, i.e., no automatic locking should occur.

The two U-shaped rings 114 are fixed with their radial inner flange 118 to the external circumference of intermediate ring 120 and of shell-shaped part 121 via shaft 101.

An actuator integrated in the shell-shaped part 121, namely an electromotor with a permanent magnet 122, collector 123 and rotor 124, actuates the brake. For the sake of simplicity, the remaining parts of the electromotor are not represented in the drawing. When the electromotor is actuated, rotor 124 rotates spindle 125 via hub 126 and intermediate ring 127.

Spindle 125 is provided with two threaded sections 128, one of these constituting a lefthand thread and one a righthand thread. A nut 129 engages in each threaded section 128 of spindle 125. Each nut 129 is fixed to one of the two disc washers 110, namely to the LH disc washer 110 shown in FIG. 3 via flange 130 and distance sleeves 131 by means of screw bolts 132.

In order to actuate the electromotor, rotor 124 thus rotates the two nuts 129 via spindle 125, which then approach or recede from one another depending on the direction of rotation of spindle 125, hence closing or opening the brake through axial movement of the two cones 103 in the appropriate direction.

The threaded sections 128 of spindle 125 are self-locking. This automatic locking means that the actuator or electromotor, respectively, need only be triggered in order to close or open the brake.

Despite this self-locking feature, vibrations or shocks can lead to the brake becoming released unintentionally. In order to prevent this, hub 126 is pivoted; furthermore, ratchet wheel 133 secured to disc washer 110 on the rigthand side in FIG. 3, two leaf springs 134 and 135 secured to intermediate ring 127, one U-shaped part 136 (represented in FIG. 4 only), stop 137 on intermediate ring 127, with which a finger attached to the rear of U-shaped part 136 interacts (not represented in FIG. 4), as well as ball notch 138, are also provided to this end.

This locking device functions as follows. When the actuator or electromotor is triggered, rotor 124 rotates hub 126 in the direction of the arrow shown in FIG. 4, and the acting ball notch 138 unlatches. Hub 126 rotates until the finger, not represented in the drawing, attached to U-shaped part 136 of hub 126 engages at stop 137 of intermediate ring 127, whereby ball notch 138 latches again. During this rotation, leaf spring 134 lying in the direction of the arrow is lifted by U-shaped part 136 out of ratchet wheel 133, and the other leaf spring 135 is released. If rotor 124 now continues to rotate in the same direction, it moves spindle 125 via intermediate ring 127. The released leaf spring 135 is drawn over ratchet wheel 133 and immediately rotor 124 comes to a standstill prevents spindle 125 from turning in the opposite direction. Leaf spring 135 is only lifted when the direction of rotation of rotor 124 is reversed, so that spindle 125 can be rotated in the opposite direction.

Ball notch 138, acting at both end positions of hub 126, prevents the locking mechanism from becoming released automatically upon exposure to vibrations and shock.

What is claimed is:

1. A clutch and brake bearing protection comprising:
    a housing;
    a first shaft rotatably mounted to the housing;
    at least one bearing connected between said housing and said first shaft for rotatably mounting said first shaft to said housing;
    a second shaft coaxially mounted and at least partially extending within said first shaft adapted to drive a load with rotation of said second shaft, said second shaft being radially and axially free of said first shaft;
    drive means connected to said first shaft for rotating said first shaft;
    shaft coupling means connected to said first and second shafts movable into a first position for engaging said first shaft to said second shaft against relative axial and radial motion and to a second position for disengaging said first shaft from said second shaft and for permitting relative axial and radial motion between said first and second shafts;
    a friction brake connected between said second shaft and said housing and associated with said coupling means for movement into a first position with said coupling means in its second position for engaging said second shaft with said housing to transmit forces from said second shaft to said housing when said first and second shafts are disengaged from each other;
    said coupling means comprising a threaded spindle rotatably mounted in said second shaft, a nut threaded to said threaded spindle and a coupling member connected to said nut for movement, with rotation of said spindle into simultaneous engagement with at least a portion of said first and second shafts to engage said first and second shafts to each other, said friction brake connected to said nut and operable by said threaded spindle simultaneously with the operation of said coupling means for disengaging said first and second shafts simultaneously with the engagement of said second shaft with said housing, said friction brake having a brake shoe connected to said nut and movable to simultaneously engage at least a portion of said housing with said second shaft simultaneously.

2. A unit according to claim 1 wherein said coupling means includes an additional nut threaded to said spindle having an opposite direction thread from said first mentioned nut and a further coupling member connected to said additional nut for movement, with rotation of said spindle into simultaneous engagement with at least a further portion of said first and second shafts to engage said first and second shafts to each other.

3. A shaft and clutch unit with bearing protection comprising:
a housing;
a first shaft rotatably mounted to the housing;
at least one bearing connected between said housing and said first shaft for rotatably mounting said first shaft to said housing;
a second shaft coaxially mounted and at least partially extending within said first shaft adapted to drive a load with rotation of said second shaft, said second shaft being radially and axially free of said first shaft;
drive means connected to said first shaft for rotating said first shaft;
shaft coupling means connected to said first and second shafts movable into a first position for engaging said first shaft to said second shaft in a selected relative axial and radial position and against relative axial and radial motion from said selected position, and to a second position for disengaging said first shaft from said second shaft in a rotational direction, in an axial direction and in a radial direction; and
each of said first and second shafts having a pair of oppositely facing tapered surfaces, said coupling means comprising a pair of coupling members each having a tapered ring thereon, said tapered ring of each of said pair of coupling members facing in an opposite direction and each movable axially so as to engage one tapered surface of each of said first and second shafts, said coupling means further including actuator means connected to said pair of coupling members for moving said tapered rings axially and in opposite directions for engaging said pair of oppositely facing tapered surfaces of said first and second shaft in said first position of said coupling means, and disengaging from said pair of oppositely facing tapered surfaces in said second position of said coupling means.

4. A unit according to claim 1, wherein said friction brake comprises a first brake member connected to and extending from said second shaft and carrying a brake lining surface, and a brake lining defined on said housing.

5. A unit according to claim 4, wherein said first brake member comprises a flange extending from said second shaft, a brake ring extending from said flange for carrying said brake lining of said second shaft, said brake shoe comprising at least one tapered ring.

6. A unit according to claim 1, wherein said drive means for driving said first shaft comprises at least one torque unit provided between said first shaft and said housing.

7. A unit according to claim 3, including brake means connected between said second shaft and said housing and connected to said actuator means for movement into a first position with said coupling means in its second position for engaging said second shaft with said housing to transmit forces from said second shaft to said housing when said first and second shafts are disengaged from each other, said brake means movable into a second position by said actuator means when said coupling means is in its first position for disengaging said second shaft from said housing when said first and second shafts are engaged together by said coupling means.

8. A unit according to claim 7, wherein said actuator means comprises a threaded shaft rotatably mounted to said second shaft, a pair of first nuts threaded to said spindle, each of said pair of first nuts having an oppositely directed thread so that rotation of said spindle in one direction moves said nuts in opposite directions, each of said nuts connected to one of said coupling members, and a spindle driver connected to said threaded spindle for rotating said threaded spindle.

9. A unit according to claim 8, including a second nut threaded to said spindle for axial movement with rotation of said spindle, said brake means comprising a first brake member connected to said second nut for axial movement with movement of said second nut, a first brake shoe connected to said first brake member, and a brake lining on each of said housing and second shaft engageable with said first brake shoe.

10. A unit according to claim 9, wherein said brake means comprises a second brake member having a second brake shoe and connected to one of said pair of first nuts threaded to said spindle, a second brake lining defined on each of said housing and said second shaft facing in a direction opposite from said first brake lining and for engagement by said second brake shoe with rotation of said spindle.

11. A unit according to claim 10, wherein each of said first and second brake shoes are tapered, said first and second brake linings each being inclined for engaging said first and second brake shoes.

* * * * *